Jan. 18, 1955   B. J. DENNISON ET AL   2,700,007
METHOD AND APPARATUS FOR SHAPING A PLASTIC INTERLAYER
FOR A CURVED LAMINATED WINDSHIELD
Filed Aug. 15, 1952
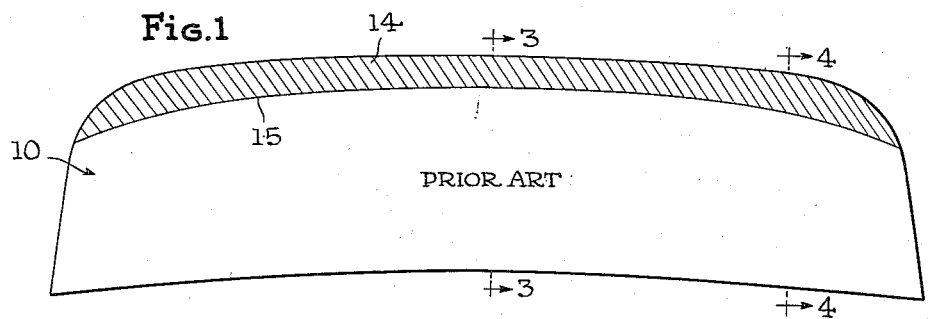
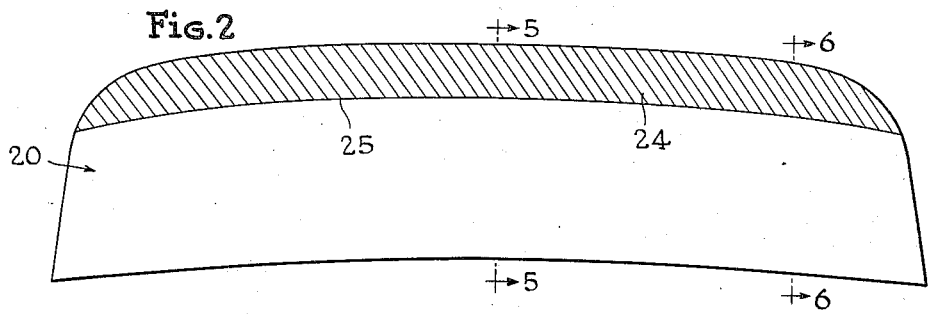
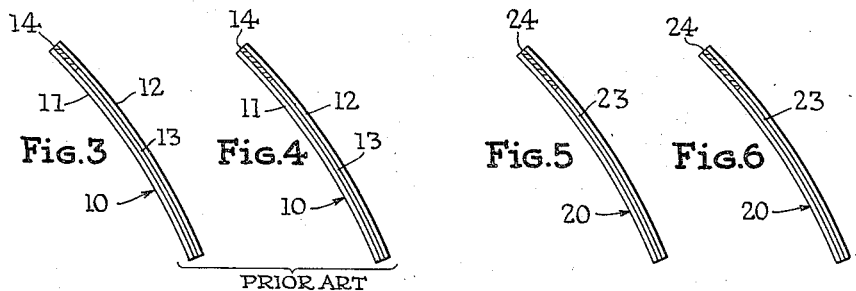
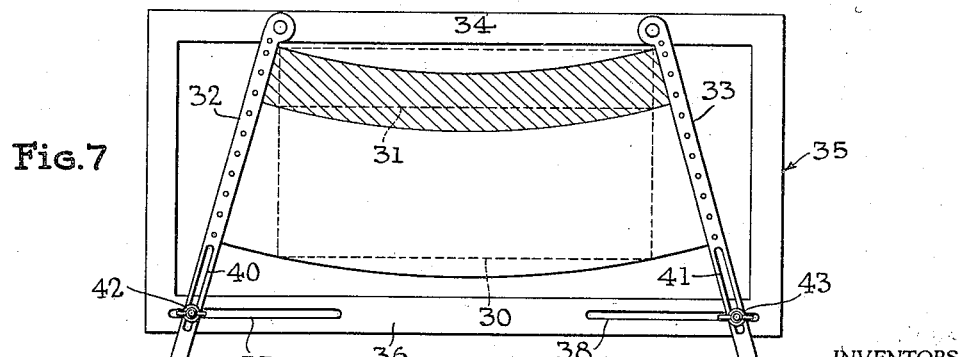
INVENTORS
Brook J. Dennison
and William G. Smith
BY
Oscar L. Spencer
ATTORNEY.

United States Patent Office 2,700,007
Patented Jan. 18, 1955

2,700,007

METHOD AND APPARATUS FOR SHAPING A PLASTIC INTERLAYER FOR A CURVED LAMINATED WINDSHIELD

Brook J. Dennison and William G. Smith, Tarentum, Pa., assignors to Pittsburgh Plate Glass Company Application August 15, 1952, Serial No. 304,594

6 Claims. (Cl. 154—2.7)

This invention relates to improvements in curved laminated windshields for motor vehicles, and more particularly to apparatus for making a partially colored plastic interlayer therefor and to a method of making such interlayer by stretching and sagging operations.

Laminated windshields having an upper portion thereof colored to eliminate the necessity for an external sun visor have been found desirable. Where a windshield is curved to provide maximum visibility for the vehicle operator, it is desirable to have the cut-off line joining the transparent lower portion with the colored upper portion substantially horizontal when the windshield is permanently installed in the vehicle. Since one-piece windshields are curved longitudinally and may be curved vertically, and also may be sloped or tilted back from the vertical when installed in a vehicle, difficulties have arisen in assuring that the cut-off line joining the colored area with the clear area will be substantially horizontal after the installation of such windshields in a vehicle.

One object of this invention is the provision of novel method for shaping a plastic interlayer for laminated windshields having a colored band extending across the upper portion of the windshield to serve as a self-contained sun visor.

Another object of this invention is the provision of novel apparatus for preforming a plastic windshield interlayer having a colored band extending across the upper portion and providing a horizontal blend line with a clear lower portion when incorporated in a laminated windshield which is curved longitudinally and vertically and installed in a vehicle at an angle to the vertical.

Other objects and advantages of the invention will become more apparent from the following detailed description of a preferred embodiment and its method of making.

In the drawings, Figure 1 is a front elevational view of a vehicle windshield having a colored interlayer formed by conventional prior art methods.

Figure 2 is a front elevational view of a vehicle windshield embodying the principles of our invention.

Figure 3 is a vertical section taken on line 3—3 of Figure 1.

Figure 4 is a vertical section taken on line 4—4 of Figure 1.

Figure 5 is a vertical section taken one line 5—5 of Figure 2.

Figure 6 is a vertical section taken on line 6—6 of Figure 2.

Figure 7 is a plan view of stretching apparatus for preforming the partially colored interlayer used in the laminated windshield shown in Figures 2, 5, and 6.

In the section views, Figures 3–6, inclusive, the thickness of the laminations has been exaggerated for the purpose of illustration.

Referring to the drawings, the laminated windshield 10, shown in Figures 1, 3, and 4, comprises two layers 11 and 12 of clear glass joined by a plastic interlayer 13. The upper portion of the interlayer 13 is provided with a band 14 of a color, such as green, applied by printing on or dyeing a portion of the interlayer 13 before its assembly with glass layers 11 and 12. Such prior art windshield layers are assembled and bonded by conventional methods and may be curved both longitudinally and vertically to the desired shape. When such windshields are made with an interlayer having a colored band across a top portion of the interlayer, the use of a color band of even vertical width does not result in a curved windshield having the blend line 15 horizontal after installation of the curved windshield in a tilted position in a vehicle. The curvature of the prior art windshield and its mounting in a tilted position results in the blend line 15 becoming curved, convex upward, as illustrated in Figures 1, 3, and 4. In the central portion of the windshield 10, the depth of the blend line 15 from the upper edge of the windshield is less, as shown in Figure 3, than it is in the side portion of the windshield, as shown in Figure 4. Plastic interlayers for visored windshields have also been formed by distorting the interlayer by applying tension to the center of the interlayer in a direction perpendicular to the horizontal axis of the interlayer.

The improved windshield 20 shown in Figures 2, 5, and 6 includes a preformed interlayer 23 resulting in a blend line 25 which is substantially horizontal after the windshield is curved longitudinally and vertically and is installed in a tilted position in a vehicle. As shown in Figures 5 and 6, the depths of the colored portion 24 of the improved interlayer 23 at the center of the windshield and at a side portion are such that the blend line 25 will be substantially horizontal, rather than convex upward as in the Figure 1 prior art windshield.

The preformed interlayer 23 is preferably formed by stretching a sheet of plastic vinyl material in stretching apparatus such as that illustrated in Figure 7. A plastic sheet of the substantially rectangular shape shown by dotted lines 30 in Figure 7, and having an even width band of color 31 across the upper portion, is securely clamped only at its side edges in clamping bars 32 and 33. The clamping bars 32 and 33 are pivotally mounted on pins journaled in the upper bar 34 of a suitable rectangular and rigid frame 35. The lower bar 36 of the rigid frame 35 is provided with slots 37 and 38, and the lower portions of the clamps 32 and 33 are also provided with slots 40 and 41. The pivoted clamps 32 and 33 are provided with suitable adjustable clamping means 42 and 43, such as a bolt and wing nut, to secure the clamping bars in the positions illustrated with the interlayer sheet 23 stretched. During pivotal movement of clamping bars 32 and 33 away from each other, the original rectangular interlayer sheet 30 is stretched more at the bottom edge than at the top edge. While the plastic interlayer sheet 23 is so stretched, it is subjected to heat to relieve the plastic material of internal stresses and to cause the unclamped horizontal edges and the colored area 31 to sag downward to the position illustrated in solid lines in Figure 7. After cooling, the curved-edge interlayer 23 is removed from the clamping bars 32 and 33 and is draped over a piece of properly curved windshield glass with the curved cut-off line between the clear and the dyed portions of the interlayer positioned to provide a substantially horizontal blend line when the windshield is mounted in a tilted position. A second layer of curved clear glass is then positioned over the interlayer 23, and the two layers of curved glass with the interlayer 23 between are sealed around the marginal edges and passed through an autoclave to bond the laminated assembly into an integral unit 20. Upon installation in a tilted position in a vehicle, said windshield 20 will have a substantially horizontal blend line 25, as shown in Figure 2.

By way of specific example, an interlayer may be preformed by securely clamping the side edges of a substantially rectangular sheet 30 of vinyl plastic fifty-four and one-half inches long at the upper edge and about eighteen inches wide, and having a colored band about five and one-quarter inches wide across the upper portion, in the side clamps 32 and 33. The lower edge of the sheet 30 may initially be slightly longer than upper edge so that the initial angle between the upper edge and a side edge is about ninety-one and three-quarters degrees. The lower ends of the clamping bars 32 and 33 are then moved outward away from one another to stretch the interlayer sheet, more stretching taking place in the lower portion of the interlayer than in the upper colored portion. The clamps 32 and 33 are then secured to the frame member 36 by suitable clamping means 42 and 43 to hold the vinyl sheet stretched. The amount of stretching for a sheet of the dimensions specified may be the stretch produced by moving the clamping bars from initial positions in which their axes make angles of ninety-one and three-quarters degrees with the top edge of the sheet to final positions in which their axes make angles of ninety-eight and three-quarters degrees with said top edge. With such a stretch, the top edge of the sheet is stretched approximately one inch and the bottom edge is stretched approximately five inches. With the vinyl sheet held in the stretched position, it is heated, while being held in a vertical position, to relieve internal stresses and to cause the central portion to sag downward. Temperatures in the range of 150–175° F. are suitable, and a temperature of 160° F. for about two hours has been found adequate to relieve stresses and to result in proper sag. During the heating step, the upper edge, blend line, and lower edge of the sheet sag to the positions illustrated in solid lines in Figure 7. The sheet 23 is then cooled, removed from the clamping bars 32 and 33, cut to approximate shape and size, and is then ready for lamination between two sheets of curved glass. After lamination, the curved assembly may be passed through an autoclave to bond the laminated assembly into an integral unit. The bonded unit is then trimmed and its edges smoothed to form the windshield 20 shown in Figure 2. Installation of windshield 20 with its vertical center line tilted rearward at an angle of about forty-eight and one-half degrees from the horizontal results in a windshield having the blend line 25 substantially in a horizontal plane.

The stretching apparatus may be assembled in various sizes for preforming windshield interlayers for various installations. While the above example gives dimensions for a typical installation, it will be apparent that the amount of stretching and sagging required to produce an interlayer which will result in a horizontal blend line depends on the amount of curvature of the completed windshield and upon its intended installation angle in the vehicle.

It will be apparent to those skilled in the art that various minor modifications and variations in the nature and arrangement of the devices described are possible without departing from the spirit of this invention or the scope of the appended claims.

What we claim is:

1. The method of preforming a plastic interlayer for a laminated windshield comprising the steps of applying a transverse band of color across the upper portion of a plastic sheet, stretching said sheet in a transverse direction with more stretch being applied to the lower portion of the sheet than to the upper portion of the sheet, and heating said sheet while stretched to relieve tension stresses therein and to sag the central portion of said sheet downward.

2. The method of preforming a plastic interlayer for a laminated windshield comprising the steps of applying a transverse horizontal band of color across the upper portion of a sheet of clear plastic material, pulling the side edges of said sheet in opposite directions while the top and the bottom edges are free to stretch said sheet in a transverse direction with more stretch being applied to the clear lower portion of said sheet than to the colored upper portion of said sheet, and heating said sheet while stretched and while positioned in a vertical plane to relieve tension stresses therein and to cause the central portion of said sheet to sag downward forming a curved cut-off line where the colored portion of said sheet joins the clear portion of said sheet.

3. The method of preforming a plastic interlayer for a curved and tilted laminated windshield comprising the steps of applying a transverse band of color across the upper portion of a clear vinyl plastic sheet, stretching said sheet in a transverse direction with more stretch being applied to the lower portion of the sheet than to the upper portion of the sheet, heating said sheet in a vertical position while stretched to relieve tension stress in the sheet and to cause the central portion of said sheet to sag downward, and cooling said sheet while said colored portion of the sheet has a convex downward edge adjacent the clear portion of said sheet.

4. The method of making a curved and laminated windshield provided with an interlayer with a colored upper portion having a horizontal blend line when said windshield is installed in a tilted position, said method comprising the steps of differentially stretching an interlayer sheet of vinyl plastic having a colored upper portion, the lower portion of said sheet being given more transverse stretch than the upper colored portion of said sheet, heating said interlayer sheet while stretched and in a vertical position to relieve tension stresses and cause the central portion of said sheet to sag, cooling said interlayer sheet, draping said interlayer sheet over a layer of curved windshield glass, applying a second layer of curved glass over said interlayer, and bonding said glass laminations to each side of said sheet by heat to form a windshield.

5. Apparatus for stretch forming a partially colored plastic interlayer sheet for laminated windshields, said apparatus comprising in combination a rigid frame, a pair of clamping bars having their upper portion pivotally secured to said frame, said bars being adapted to securely engage and clamp the side margins of said partially colored plastic interlayer sheet, and adjustable clamping means engaging the lower portions of said clamping bars and said frame to secure said bars with said sheet longitudinally stretched extending therebetween.

6. Apparatus for stretch forming a partially colored plastic interlayer sheet for laminated windshields, said apparatus comprising a rigid frame, a pair of clamping bars, the upper ends of said bars being pivotally secured to the top of said frame, said bars being engageable with and securable to the side margins of said interlayer sheet, and adjustable clamping means positioned in slots in the lower portion of said bars and said frame to secure the lower ends of said bars spaced apart with said plastic sheet stretched longitudinally therebetween.

References Cited in the file of this patent

UNITED STATES PATENTS

| | | |
|---|---|---|
| 2,515,830 | Mahler | July 18, 1950 |
| 2,593,405 | Beckham | Apr. 22, 1952 |